United States Patent
Oh (10) Patent No.: US 11,932,079 B2
(45) Date of Patent: Mar. 19, 2024

(54) INTEGRATED THERMAL MANAGEMENT MODULE OF VEHICLE

(71) Applicants: Hyundai Motor Company, Seoul (KR); Kia Corporation, Seoul (KR)

(72) Inventor: Man Ju Oh, Yongin-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/730,446

(22) Filed: Apr. 27, 2022

(65) Prior Publication Data

US 2023/0120222 A1 Apr. 20, 2023

(30) Foreign Application Priority Data

Oct. 14, 2021 (KR) .................. 10-2021-0136840

(51) Int. Cl.
*B60H 1/00* (2006.01)
(52) U.S. Cl.
CPC ..... *B60H 1/00535* (2013.01); *B60H 1/00457* (2013.01); *B60H 1/00521* (2013.01)
(58) Field of Classification Search
CPC .......... B60H 2001/006; B60H 1/00535; B60H 1/00457; B60H 1/00521; B60H 1/00542
See application file for complete search history.

(56) References Cited

U.S. PATENT DOCUMENTS

| | | | |
|---|---|---|---|
| 6,557,772 B1* | 5/2003 | Pettigiani | B62D 25/081 237/12.3 B |
| 7,748,441 B2 | 7/2010 | Litwing et al. | |
| 2011/0284298 A1* | 11/2011 | Ajisaka | B60H 1/00542 180/65.21 |
| 2020/0377002 A1* | 12/2020 | Tezza, II | B60N 3/001 |
| 2021/0053415 A1 | 2/2021 | Oh et al. | |
| 2023/0120222 A1 | 4/2023 | Oh | |

FOREIGN PATENT DOCUMENTS

| | | | | |
|---|---|---|---|---|
| CN | 108081910 A | * | 5/2018 | ......... B60H 1/00028 |
| CN | 113602057 A | * | 11/2021 | |
| KR | 20220012512 A | * | 4/2020 | |
| KR | 20210022220 A | | 3/2021 | |

OTHER PUBLICATIONS

CN-108081910-A English Translation (Year: 2018).*
KR-20220012512-A English Translation (Year: 2020).*
CN-113602057-A English Translation (Year: 2021).*
United States Patent and Trademark Office, Office Action Summary issued in U.S. Appl. No. 17/737,462, dated Aug. 9, 2023, 13 pages.

* cited by examiner

Primary Examiner — David J Teitelbaum
(74) Attorney, Agent, or Firm — Slater Matsil, LLP (57) ABSTRACT

An embodiment integrated thermal management module of a vehicle includes a heat dissipation fan module disposed between opposite side frames of an underbody of the vehicle and mounted on a cross member that connects the opposite side frames to each other, the heat dissipation fan module being configured to transfer vibration to the cross member and to exchange heat of external air of the vehicle with heat of a cooling medium of an outdoor heat exchanger, and a cooling medium circulating unit provided on a side of the heat dissipation fan module.

20 Claims, 5 Drawing Sheets

Type A

Type B

FIG. 5

Type A

Type B

INTEGRATED THERMAL MANAGEMENT MODULE OF VEHICLE

CROSS-REFERENCE TO RELATED APPLICATIONS

This application claims the benefit of Korean Patent Application No. 10-2021-0136840, filed on Oct. 14, 2021, which application is hereby incorporated herein by reference.

TECHNICAL FIELD

The present invention relates to an integrated thermal management module of a vehicle.

BACKGROUND

Recently, due to policies for extensively supplying an eco-friendly vehicle and due to a preference for a high fuel-efficient vehicle, the number of registered eco-friendly vehicles is increasing. An electric vehicle, which is the eco-friendly vehicle, is a vehicle that does not use oil fuel and an engine but is operated by using an electric battery and an electric motor. The electric vehicle has a system in which the electric vehicle is driven by rotating the electric motor with electricity accumulated in the electric battery, so that the electric vehicle has advantages in that the electric vehicle does not emit harmful substances, produces less noise, and has high energy efficiency.

In a vehicle that uses power of a conventional engine, a heating system configured to heat an indoor space of the vehicle has been operated by using waste heat of the engine. However, since the electric vehicle does not have an engine, the electric vehicle has a system operating a heater by using electricity. Therefore, there is a problem that a mileage of the electric vehicle is significantly decreased when the electric vehicle is heated.

In addition, a battery module is required to be used in an optimal temperature environment in order to maintain an optimal performance and a long lifespan of the battery module. However, due to the heat generated during operation of the battery module and the change in external temperature, it is difficult to use the battery module in the optimal temperature environment.

In order to solve these problems, a method of organically combining an air conditioning system and a heat management system of the electric vehicle to each other has been actively discussed.

Meanwhile, unlike a conventional internal combustion engine vehicle, the electric vehicle does not require an engine and the like that are to be positioned in the front of the electric vehicle, so that the electric vehicle has a very high space utilization rate compared to that of the internal combustion engine vehicle. Further, it is necessary to develop an integrated thermal management module for a vehicle, the integrated thermal management module being configured such that components for the air conditioning system and for the heat management system are modularized and are compact, thereby being capable of maximally securing the internal space of the vehicle, reducing the manufacturing cost and the raw material cost, securing coupling strength with a vehicle body, and minimizing vibration of the components generating the vibration.

The foregoing is intended merely to aid in the understanding of the background of the present invention, and is not intended to mean that the present invention falls within the purview of the related art that is already known to those skilled in the art.

SUMMARY

The present invention relates to an integrated thermal management module of a vehicle provided, e.g., on an underbody of the vehicle in which wheels and a driving unit of the vehicle are positioned. Particular embodiments relate to an integrated thermal management module, the integrated thermal management module including a heat dissipation fan module disposed between opposite side frames of the underbody of the vehicle and mounted on a cross member that connects the opposite side frames to each other, the heat dissipation fan module being configured to transfer vibration to the cross member and being configured to exchange heat of external air of the vehicle with heat of a cooling medium of an outdoor heat exchanger.

Accordingly, embodiments of the present invention keep in mind problems occurring in the related art, and an embodiment of the present invention provides an integrated thermal management module of a vehicle provided on an underbody of the vehicle in which wheels and a driving unit of the vehicle are positioned, the integrated thermal management module including a heat dissipation fan module disposed between opposite side frames of the underbody of the vehicle and mounted on a cross member that connects the opposite side frames to each other, the heat dissipation fan module being configured to transfer vibration to the cross member and being configured to exchange heat of external air of the vehicle with heat of a cooling medium of an outdoor heat exchanger, the integrated thermal management module including a cooling medium circulating unit, and the integrated thermal management module being capable of offsetting the vibration generated from the heat dissipation fan module and the cooling medium circulating unit by using bushes.

An embodiment of the present invention provides an integrated thermal management module of a vehicle provided on an underbody of the vehicle in which wheels and a driving unit of the vehicle are positioned, the integrated thermal management module including a heat dissipation fan module disposed between opposite side frames of the underbody of the vehicle and mounted on a cross member that connects the opposite side frames to each other, the heat dissipation fan module being configured to transfer vibration to the cross member and being configured to exchange heat of external air of the vehicle with heat of a cooling medium of an outdoor heat exchanger, and a cooling medium circulating unit provided on a side of the heat dissipation fan module.

The cooling medium circulating unit may be mounted on the cross member together with the heat dissipation fan module and may transfer the vibration to the cross member, and may be configured to compress and transfer the cooling medium.

The cooling medium circulating unit and the heat dissipation fan module may be mounted on the cross member via bushes respectively provided on a lower end of the cooling medium circulating unit and a lower end of the heat dissipation fan module such that the vibration is insulated, and the vibration transferred to the cross member may be offset by weight of the cooling medium circulating unit and by weight of the heat dissipation fan module.

The cooling medium circulating unit may include a compressor configured to compress the cooling medium, and may include a pump configured to transfer the cooling medium. Further, the compressor and the pump may be mounted on the heat dissipation fan module via bushes respectively provided on a side of the compressor and a side of the pump such that the vibration is insulated.

The cross member may include a base portion extending in a width direction and may include coupling portions formed on end portions of the base portion, and the coupling portions may connect the opposite side frames to each other by being coupled to the side frames.

The heat dissipation fan module and the cooling medium circulating unit may be mounted on a top surface of the base portion of the cross member, the coupling portions may be formed by bending the end portions of the base portion upwardly and outwardly from the vehicle, and the coupling portions may be respectively coupled to and supported by side surfaces and top surfaces of the side frames.

The coupling portions of the cross member may be respectively coupled to upper ends of the side frames via bushes respectively provided on lower ends of the coupling portions such that the vibration is insulated, and the vibration transferred to the side frames may be offset by weight of the cross member.

The heat dissipation fan module and the cooling medium circulating unit may be mounted on the cross member that is positioned in the front of the vehicle, and the cross member on which the heat dissipation fan module and the cooling medium circulating unit are mounted may be positioned further forward than front wheels of the vehicle.

The cooling medium circulating unit may be provided on the side of the heat dissipation fan module, and may be disposed inside or outside the side frames of the underbody of the vehicle.

According to the integrated thermal management module of the vehicle provided on the underbody of the vehicle in which the wheels and the driving unit of the vehicle are positioned, the integrated thermal management module of the vehicle includes the heat dissipation fan module disposed between the opposite side frames of the underbody of the vehicle and mounted on the cross member that connects the opposite side frames to each other, the heat dissipation fan module being configured to transfer vibration to the cross member and being configured to exchange heat of external air of the vehicle with heat of the cooling medium of the outdoor heat exchanger, and includes the cooling medium circulating unit, so that the vibration generated from the heat dissipation fan module and the cooling medium circulating unit may be offset by using the bushes.

BRIEF DESCRIPTION OF THE DRAWINGS

The above and other objectives, features, and other advantages of embodiments of the present invention will be more clearly understood from the following detailed description when taken in conjunction with the accompanying drawings, in which.

DETAILED DESCRIPTION OF ILLUSTRATIVE EMBODIMENTS

Figure 1:
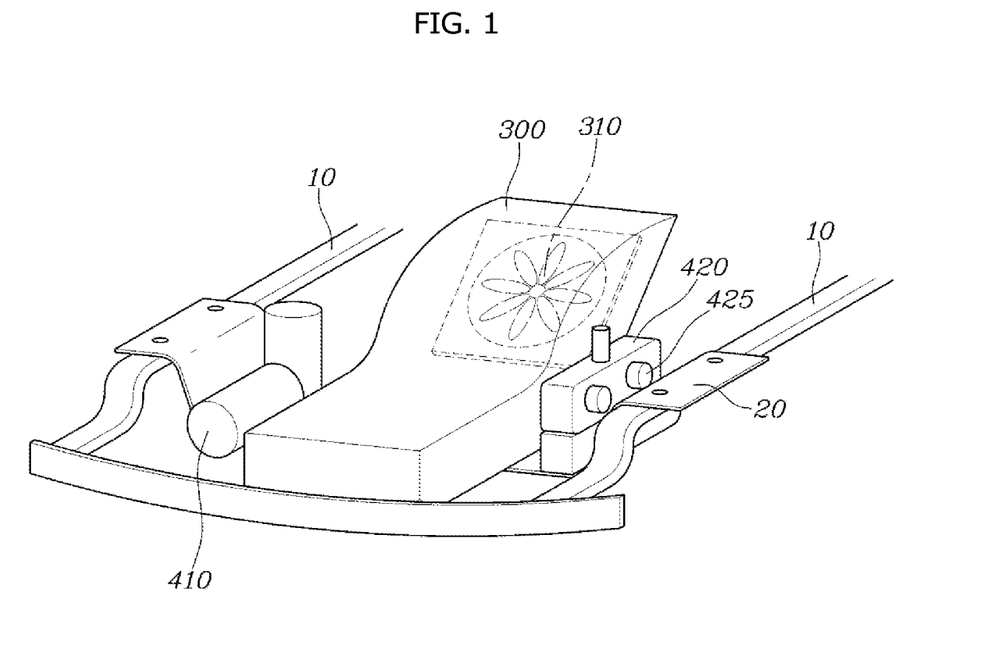
FIG. 1 is a view schematically illustrating an integrated thermal management module of a vehicle according to an embodiment of the present invention.
Figure 2:
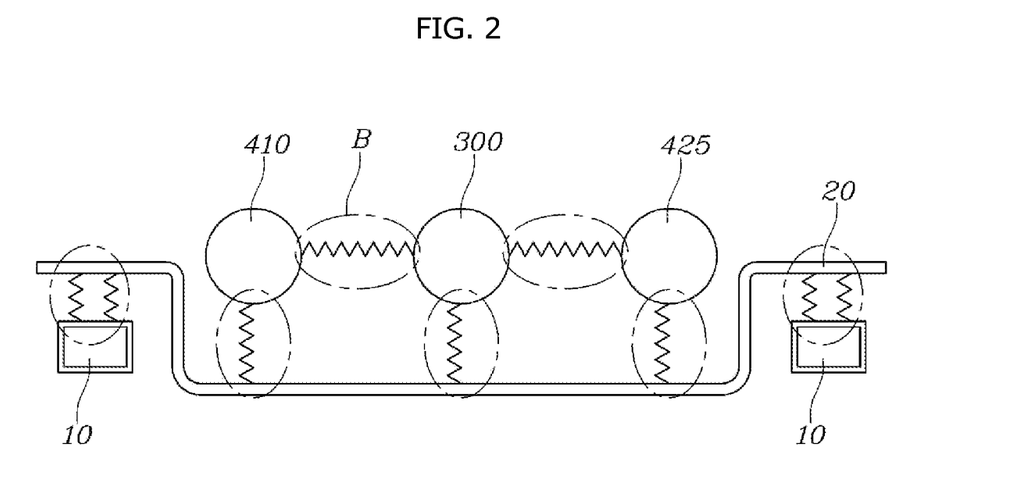
FIG. 2 is a side view schematically illustrating the integrated thermal management module of the vehicle according to an embodiment of the present invention.
Figure 3:
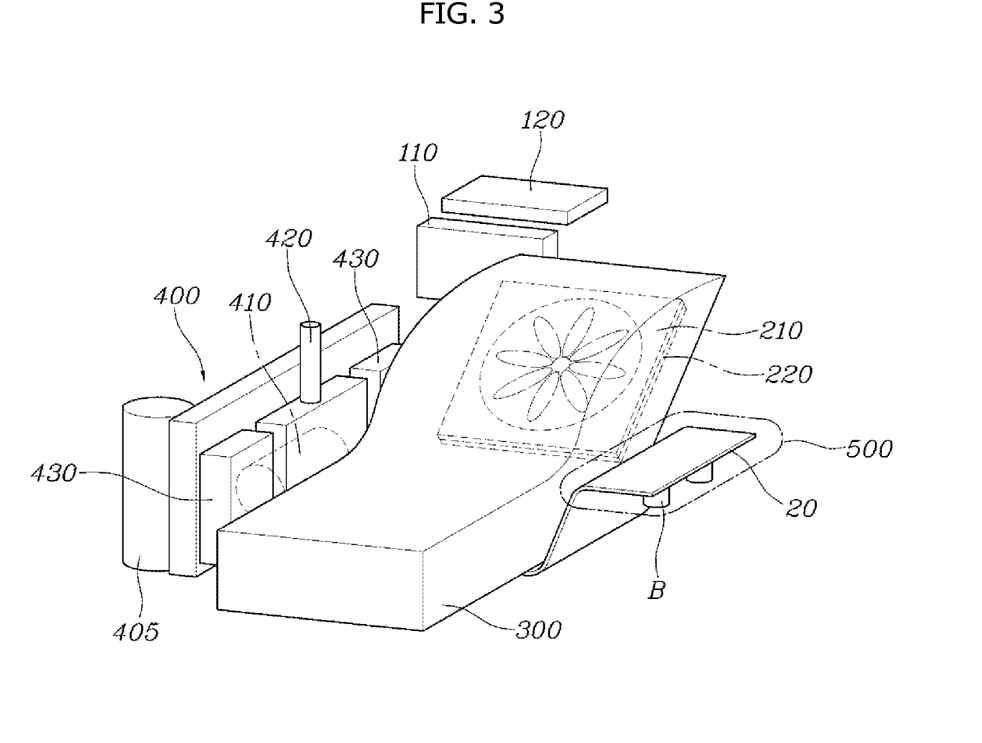
FIG. 3 is a perspective view illustrating the integrated thermal management module of the vehicle according to an embodiment of the present invention.
Figure 4:
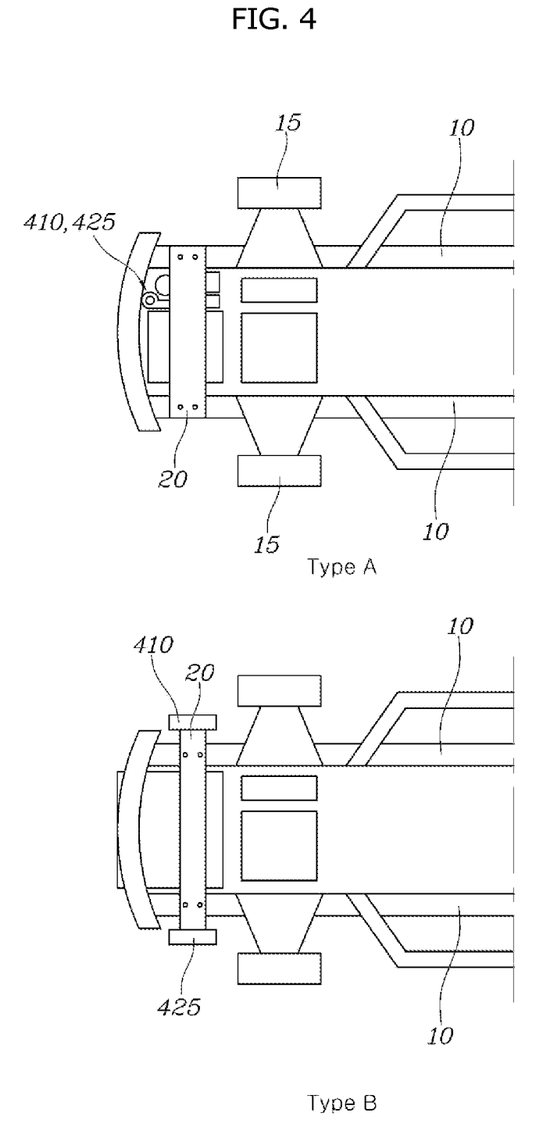
FIG. 4 shows plan views schematically illustrating two types of the integrated thermal management module of the vehicle according to an embodiment of the present invention.
Figure 5:
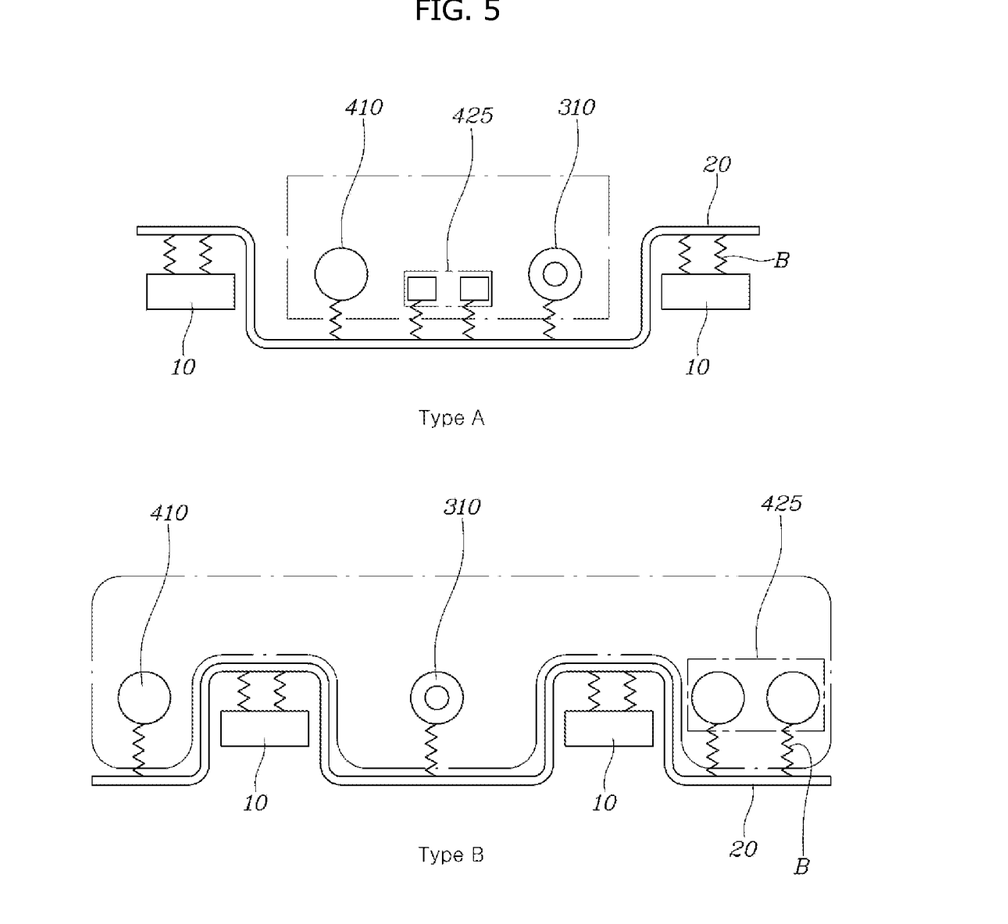
FIG. 5 shows side views schematically illustrating the two types of the integrated thermal management module of the vehicle according to an embodiment of the present invention.

FIG. 1 is a view schematically illustrating an integrated thermal management module of a vehicle according to an embodiment of the present invention. FIG. 2 is a side view schematically illustrating the integrated thermal management module of the vehicle according to an embodiment of the present invention. FIG. 3 is a perspective view illustrating the integrated thermal management module of the vehicle according to an embodiment of the present invention. FIG. 4 shows plan views schematically illustrating two types of the integrated thermal management module of the vehicle according to an embodiment of the present invention. FIG. 5 shows side views schematically illustrating the two types of the integrated thermal management module of the vehicle according to an embodiment of the present invention.

FIG. 1 is a view schematically illustrating an integrated thermal management module of a vehicle according to an embodiment of the present invention. In the integrated thermal management module of the vehicle according to an embodiment of the present disclosure, the integrated thermal management module of the vehicle is an integrated thermal management module of a vehicle provided on an underbody of the vehicle in which wheels and a driving unit of the vehicle are positioned. Further, the integrated thermal management module of the vehicle includes a heat dissipation fan module 300 disposed between opposite side frames 10 of the underbody of the vehicle and mounted on a cross member 20 that connects the opposite side frames 10 to each other, the heat dissipation fan module 300 being configured to transfer vibration to the cross member 20 and being configured to exchange heat of external air of the vehicle with heat of a cooling medium of an outdoor heat exchanger, and a cooling medium circulating unit 400 provided on a side of the heat dissipation fan module 300.

The heat dissipation fan module 300 includes the outdoor heat exchanger for the vehicle, the outdoor heat exchanger including a radiator 210 through which a coolant circulates and an outdoor condenser 220 through which a refrigerant circulates, and includes a cooling fan 310 configured to enable air to exchange heat with the coolant or the refrigerant in the outdoor heat exchanger of the vehicle.

In addition, in the integrated thermal management module of the vehicle according to an embodiment of the present invention, the cooling medium circulating unit 400 is mounted on the cross member 20 together with the heat dissipation fan module 300, so that the cooling medium circulating unit 400 may transfer vibration to the cross member 20 and may compress and transfer the cooling medium. That is, since each of the heat dissipation fan module 300 in which the cooling fan 310 and the radiator 210 are modularized and the cooling medium circulating unit 400 that includes a compressor 410, a chiller 430, an accumulator 405, and a pump 425 that is modularized with a reservoir 420 and valves is provided as a thermal management module and is mounted on the cross member 20, weight of the heat dissipation fan module 300 and weight of the cooling medium circulating unit 400 are increased, so that the degree of influence of vibration that is applied on the vehicle may be reduced.

For reference, in FIGS. 1 and 2, a state in which the compressor 410, the pump 425, and the reservoir 420 that configure the cooling medium circulating unit 400 are separately disposed on a left side and a right side of the heat dissipation fan module 300 is illustrated. In this situation, the compressor 410, the chiller 430, the accumulator 405, and so on through which the refrigerant circulates are provided on the left side of the heat dissipation fan module 300, so that a length of a line through which the refrigerant circulates is minimized. Further, the pump 425 modularized with the reservoir 420, the valves, and so on, through which the coolant circulates, are provided on the right side of the heat dissipation fan module 300. In this situation, the degree of design freedoms of components related to the refrigerant and components related to the coolant are secured, and there is an advantage that modularizing of the components is easily realized.

In FIG. 3, a state in which the compressor 410, the pump 425, and the reservoir 420 are modularized and disposed on one side of the heat dissipation fan module 300 is illustrated. In this situation, it is possible to modularize the compressor 410, the pump 425, and the reservoir 420 into one or to physically connect the compressor 410, the pump 425, and the reservoir 420 to each other while a line length of the refrigerant and a line length of the coolant are shortened. Therefore, there is an advantage that mass for insulating vibration may be maximally increased.

Particularly, there is an advantage that the integrated thermal management module of the vehicle according to an embodiment of the present invention may be applied in an electric vehicle having a skateboard platform. The skateboard platform refers to a structure in which the vehicle body is configured by coupling a skateboard-shaped drive module that is the underbody of the vehicle to a life module at an upper end, the life module depending on a purpose of a Purpose Built Vehicle (PBV). In this situation, the skateboard platform has high space utilization efficiency, so that an internal space of the vehicle may be easily constructed as desired.

In the integrated thermal management module of the vehicle according to an embodiment of the present invention, vibration generated in excitation units such as the compressor 410, the pump 425, and so on that are required to manage heat of the electric vehicle may be offset, and transferring of vibration to the vehicle body may be minimized. Further, since the integrated thermal management module of the vehicle is compact and is provided on a lower end of the underbody of the vehicle, the wide internal space of the vehicle may be secured. Further, since the integrated thermal management module of the vehicle is mounted on the cross member 20 that connects the opposite side frames 10 to each other, coupling strength with the vehicle body may be secured.

FIG. 2 is a side view schematically illustrating the integrated thermal management module of the vehicle according to an embodiment of the present invention. FIG. 3 is a perspective view illustrating the integrated thermal management module of the vehicle according to an embodiment of the present invention. In the integrated thermal management module of the vehicle according to an embodiment of the present disclosure, the cooling medium circulating unit 400 and the heat dissipation fan module 300 are mounted on the cross member 20 via bushes B respectively provided on a lower end of the cooling medium circulating unit 400 and a lower end of the heat dissipation fan module 300 such that vibration is insulated. Further, by weight of the cooling medium circulating unit 400 and by weight of the heat dissipation fan module 300, vibration transferred to the cross member 20 may be offset.

Specifically, in the integrated thermal management module of the vehicle according to an embodiment of the present invention, the cooling medium circulating unit 400 includes the compressor 410 configured to compress the cooling medium and includes the pump 425 configured to transfer the cooling medium. Further, the compressor 410 and the pump 425 may be mounted on the heat dissipation fan module 300 via the bushes B respectively provided on a side of the compressor 410 and on a side of the pump 425 such that vibration is insulated. Referring to FIG. 2, each of the bushes B is a vibration insulation mechanism that blocks vibration from being transferred or offsets vibration, and positions of the bushes B are illustrated by dashed-dotted ellipses.

Meanwhile, in the integrated thermal management module of the vehicle according to an embodiment of the present invention, the cross member 20 includes a base portion that extends in a width direction of the vehicle, and includes coupling portions 500 respectively formed on end portions of the base portion. Further, since the coupling portions 500 are coupled to the side frames 10, the opposite side frames 10 may be connected to each other.

In addition, in the integrated thermal management module of the vehicle according to an embodiment of the present invention, the heat dissipation fan module 300 and the cooling medium circulating unit 400 are mounted on a top surface of the base portion of the cross member 20. Further, the coupling portions 500 are formed by bending the end portions of the base portion upwardly and outwardly from the vehicle, and the coupling portions 500 may be coupled to and supported by side surfaces and top surfaces of the side frames 10.

Meanwhile, in the integrated thermal management module of the vehicle according to an embodiment of the present invention, the coupling portions 500 of the cross member 20 are respectively coupled to top ends of the side frames 10 via the bushes B such that vibration is insulated, and vibration transferred to the side frames 10 may be offset by weight of the cross member 20.

FIGS. 4 and 5 are views schematically illustrating two types of the integrated thermal management module of the vehicle according to an embodiment of the present invention. Further, FIG. 4 shows plan views illustrating type A and type B of the integrated thermal management module of the vehicle, and FIG. 5 shows side views illustrating the type A and the type B of the integrated thermal management module of the vehicle.

In the integrated thermal management module of the vehicle according to an embodiment of the present invention, the heat dissipation fan module 300 and the cooling medium circulating unit 400 are mounted on the cross member 20 that is positioned in the front of the vehicle, and the cross member 20 on which the heat dissipation fan module 300 and the cooling medium circulating unit 400 are mounted may be positioned further forward than front wheels of the vehicle.

In addition, in the integrated thermal management module of the vehicle according to an embodiment of the present invention, the cooling medium circulating unit 400 is provided on the side of the heat dissipation fan module 300, and may be disposed inside or outside the side frames 10 of the underbody of the vehicle. Referring to FIGS. 4 and 5, the integrated thermal management module of the vehicle according to an embodiment of the present invention may be provided as the type A or the type B. That is, in the integrated thermal management module of the vehicle according to an embodiment of the present invention, the compressor 410 and the pump 425 may be variously positioned inside or outside the side frames 10 depending on types of the vehicle, a vehicle body, a thermal management circuit, and so on.

In both the type A and the type B, the compressor 410 and the pump 425 are mounted on the cross member 20 and vibration is insulated. However, it is illustrated in the type A that both the compressor 410 and the pump 425 are positioned inside the opposite side frames 10 and are compactified. Further, since a distance between the opposite side frames 10 is not sufficient, it is illustrated in the type B that the compressor 410 and the pump 425 are respectively separated into the left and right sides and are disposed outside the side frames 10. In this situation, the cross member 20 surrounds the side frames 10 and extends further to the outside, and forms a position on which the compressor 410 and the pump 425 are mounted. Therefore, by optionally applying the type A or the type B depending on the design of the vehicle body, the degree of design freedom of the vehicle body may be secured.

Meanwhile, according to an embodiment of the present invention, since the integrated thermal module of the vehicle is mounted on the cross member 20 that connects the side frames 10 to each other, there is an advantage that the integrated thermal module of the vehicle may be easily assembled to any position of the underbody of the vehicle. Further, when the integrated thermal module of the vehicle is positioned further forward than the front wheels of the vehicle, there are advantages that air may be easily circulated and a cabin room space may be maximally secured.

In addition, since the cooling medium circulating unit 400 for managing heat of the vehicle is also modularized and mounted on the side of the heat dissipation fan module 300, an assembly process and a circuit configuration may be realized compactly, and the length of the coolant line and the length of the refrigerant line may be realized in a minimum length.

Although exemplary embodiments of the present invention have been described herein, it is understood that the present invention should not be limited to these exemplary embodiments and that various changes and modifications can be made by one of ordinary skill in the art within the spirit and scope of the present invention.

What is claimed is:

1. An integrated thermal management module for a vehicle, the integrated thermal management module comprising:
   a heat dissipation fan module disposed between opposite side frames of an underbody of the vehicle and mounted on a cross member that connects the opposite side frames to each other, the heat dissipation fan module being configured to transfer vibration to the cross member and to exchange heat of external air of the vehicle with heat of a cooling medium of an outdoor heat exchanger; and
   a cooling medium circulating unit provided on a side of the heat dissipation fan module, wherein the cooling medium circulating unit comprises:
      a compressor configured to compress the cooling medium; and
      a pump configured to transfer the cooling medium, wherein the compressor and the pump are mounted on the heat dissipation fan module via bushes respectively provided on a side of the compressor and a side of the pump such that the vibration is insulated.

2. The integrated thermal management module of claim 1, wherein the cooling medium circulating unit is mounted on the cross member together with the heat dissipation fan module and is configured to transfer the vibration to the cross member and to compress and transfer the cooling medium.

3. The integrated thermal management module of claim 2, wherein:
   the cooling medium circulating unit and the heat dissipation fan module are mounted on the cross member via bushes respectively provided on a lower end of the cooling medium circulating unit and a lower end of the heat dissipation fan module such that the vibration is insulated; and
   the vibration transferred to the cross member is offset by a weight of the cooling medium circulating unit and by a weight of the heat dissipation fan module.

4. The integrated thermal management module of claim 1, wherein the cross member comprises:
   a base portion extending in a width direction of the vehicle; and
   coupling portions formed on end portions of the base portion, the coupling portions connecting the opposite side frames to each other by being coupled to the side frames.

5. The integrated thermal management module of claim 4, wherein:
   the heat dissipation fan module and the cooling medium circulating unit are mounted on a top surface of the base portion of the cross member;
   the coupling portions are formed by bending the end portions of the base portion upwardly and outwardly from the vehicle; and
   the coupling portions are respectively coupled to and supported by side surfaces and top surfaces of the side frames.

6. The integrated thermal management module of claim 1, wherein:
   the heat dissipation fan module and the cooling medium circulating unit are mounted on the cross member that is positioned in a front of the vehicle; and
   the cross member on which the heat dissipation fan module and the cooling medium circulating unit are mounted is positioned further forward than front wheels of the vehicle.

7. The integrated thermal management module of claim 1, wherein the cooling medium circulating unit is provided on the side of the heat dissipation fan module and is disposed inside the side frames of the underbody of the vehicle.

8. The integrated thermal management module of claim 1, wherein the cooling medium circulating unit is provided on the side of the heat dissipation fan module and is disposed outside the side frames of the underbody of the vehicle.

9. The integrated thermal management module of claim 1, wherein the cooling medium circulating unit further comprises a chiller and an accumulator, wherein the cooling medium circulating unit is configured so that refrigerant circulates through the compressor, the chiller, and the accumulator.

10. An integrated thermal management module for a vehicle, the integrated thermal management module comprising:
    a heat dissipation fan module disposed between opposite side frames of an underbody of the vehicle and mounted on a cross member that connects the opposite side frames to each other, the heat dissipation fan module being configured to transfer vibration to the cross member and to exchange heat of external air of the vehicle with heat of a cooling medium of an outdoor heat exchanger; and a cooling medium circulating unit provided on a side of the heat dissipation fan module;

wherein the cross member comprises a base portion extending in a width direction of the vehicle and coupling portions formed on end portions of the base portion, the coupling portions connecting the opposite side frames to each other by being coupled to the side frames;

wherein the coupling portions of the cross member are respectively coupled to upper ends of the side frames via bushes respectively provided on lower ends of the coupling portions such that the vibration is insulated; and wherein the vibration transferred to the side frames is offset by a weight of the cross member.

11. A vehicle comprising:

an underbody comprising opposite side frames and a cross member connecting the opposite side frames to each other;

wheels coupled to the underbody;

a drive unit coupled to the underbody;

a heat dissipation fan module disposed between the opposite side frames and mounted on the cross member, the heat dissipation fan module being configured to transfer vibration to the cross member and to exchange heat of external air of the vehicle with heat of a cooling medium of an outdoor heat exchanger; and a cooling medium circulating unit provided on a side of the heat dissipation fan module, wherein the cooling medium circulating unit comprises:

a compressor configured to compress the cooling medium; and a pump configured to transfer the cooling medium, wherein the compressor and the pump are mounted on the heat dissipation fan module via bushes respectively provided on a side of the compressor and a side of the pump such that the vibration is insulated.

12. The vehicle of claim 11, wherein the cooling medium circulating unit is mounted on the cross member together with the heat dissipation fan module and is configured to transfer the vibration to the cross member and to compress and transfer the cooling medium.

13. The vehicle of claim 12, wherein:

the cooling medium circulating unit and the heat dissipation fan module are mounted on the cross member via bushes respectively provided on a lower end of the cooling medium circulating unit and a lower end of the heat dissipation fan module such that the vibration is insulated; and the vibration transferred to the cross member is offset by a weight of the cooling medium circulating unit and by a weight of the heat dissipation fan module.

14. The vehicle of claim 11, wherein the cross member comprises:

a base portion extending in a width direction of the vehicle; and coupling portions formed on end portions of the base portion, the coupling portions connecting the opposite side frames to each other by being coupled to the side frames.

15. The vehicle of claim 14, wherein:

the heat dissipation fan module and the cooling medium circulating unit are mounted on a top surface of the base portion of the cross member;

the coupling portions are formed by bending the end portions of the base portion upwardly and outwardly from the vehicle; and the coupling portions are respectively coupled to and supported by side surfaces and top surfaces of the side frames.

16. The vehicle of claim 14, wherein:

the coupling portions of the cross member are respectively coupled to upper ends of the side frames via bushes respectively provided on lower ends of the coupling portions such that the vibration is insulated; and the vibration transferred to the side frames is offset by a weight of the cross member.

17. The vehicle of claim 11, wherein:

the heat dissipation fan module and the cooling medium circulating unit are mounted on the cross member that is positioned in a front of the vehicle; and the cross member on which the heat dissipation fan module and the cooling medium circulating unit are mounted is positioned further forward than front wheels of the vehicle.

18. The vehicle of claim 11, wherein the cooling medium circulating unit is provided on the side of the heat dissipation fan module and is disposed inside the side frames of the underbody of the vehicle.

19. The vehicle of claim 11, wherein the cooling medium circulating unit is provided on the side of the heat dissipation fan module and is disposed outside the side frames of the underbody of the vehicle.

20. The vehicle of claim 11, wherein the cooling medium circulating unit further comprises a chiller and an accumulator, wherein the cooling medium circulating unit is configured so that refrigerant circulates through the compressor, the chiller, and the accumulator.

* * * * *